United States Patent [19]
Mueller

[11] Patent Number: 4,566,923
[45] Date of Patent: Jan. 28, 1986

[54] METHOD AND APPARATUS FOR PREFORMING AND APPLYING A HEAT-SHRINKABLE MEMBER TO A CONTAINER

[75] Inventor: Martin Mueller, Wonder Lake, Ill.

[73] Assignee: Osgood Industries, Inc., Northbrook, Ill.

[21] Appl. No.: 498,973

[22] Filed: May 27, 1983

[51] Int. Cl.⁴ ............................................... B65B 7/00
[52] U.S. Cl. ......................................... 156/69; 156/86;
156/87; 156/195; 156/212; 156/214; 156/446; 156/447; 156/458; 215/246; 264/230; 264/DIG. 71; 425/809
[58] Field of Search ................... 156/84, 86, 212, 446, 156/447, 195, 87, 214, 448, 457, 458, 294, 69, 215; 264/230, 342 R, DIG. 41, DIG. 71; 215/246, 1 C; 425/809

[56] References Cited

U.S. PATENT DOCUMENTS

| | | | |
|---|---|---|---|
| 2,802,513 | 8/1957 | Stoeckel et al. | 156/154 |
| 2,917,217 | 12/1959 | Sisson | 138/103 |
| 3,412,524 | 11/1968 | Nestell et al. | 53/212 |
| 3,880,688 | 4/1975 | Calori et al. | 156/190 |
| 3,914,152 | 10/1975 | Amberg et al. | 156/446 |
| 3,960,624 | 6/1976 | Erlandson | 156/69 |
| 4,014,724 | 3/1977 | Rausing | 264/230 |
| 4,018,640 | 4/1977 | Amberg | 264/230 |
| 4,098,862 | 7/1978 | Markhorst | 156/195 |
| 4,174,984 | 11/1979 | Meadows | 156/446 |
| 4,215,460 | 8/1980 | Amberg et al. | 156/86 |
| 4,238,267 | 12/1980 | Konstantin | 156/215 |
| 4,266,123 | 5/1981 | Friberg | 250/205 |
| 4,349,399 | 9/1982 | Obrist et al. | 264/230 |
| 4,409,045 | 10/1983 | Busse | 156/69 |
| 4,416,714 | 11/1983 | Hoffman | 156/447 |

OTHER PUBLICATIONS

"Skintight ® Heat Shrinkable Secondary Closures", Gilbreth International Corp., received 8-27-79.

*Primary Examiner*—Jay H. Woo
*Assistant Examiner*—Timothy W. Heitbrink
*Attorney, Agent, or Firm*—Dressler, Goldsmith, Shore, Sutker & Milnamow, Ltd.

[57] ABSTRACT

A method and apparatus are disclosed for preforming a heat-shrinkable member to a pre-selected configuration which may at least partially conform to a container to which the member is to be applied. The preformed member is subsequently applied to the container so that the member is retained in association therewith, such as for tamper-indication. The heat-shrinkable member is initially preformed by the use of a preforming mandrel which may be at least partially configured like the configuration of the container. After the member has been heat-shrunk on the preforming mandrel, it is positioned in association with the container, and thereafter heated so as to further conform the heat-shrinkable member to the configuration of the container. By this technique, hightly desirable control of the heat-shrinking process is achieved, thus assuring proper conformance of the heat-shrinkable member to its associated container. A further feature of the invention relates to final application of the preformed heat-shrinkable member by localized heating of the member, which desirably minimizes heating of the associated container and its contents.

13 Claims, 10 Drawing Figures

U.S. Patent    Jan. 28, 1986    Sheet 1 of 2    4,566,923
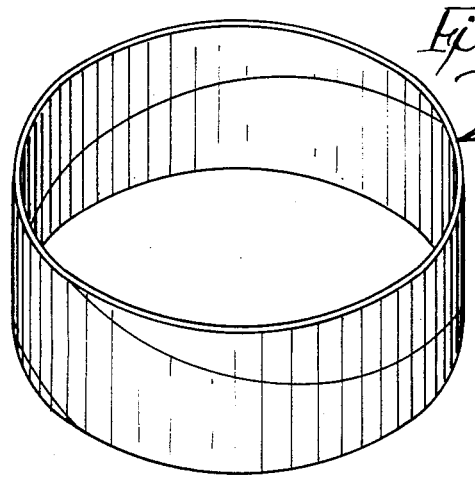
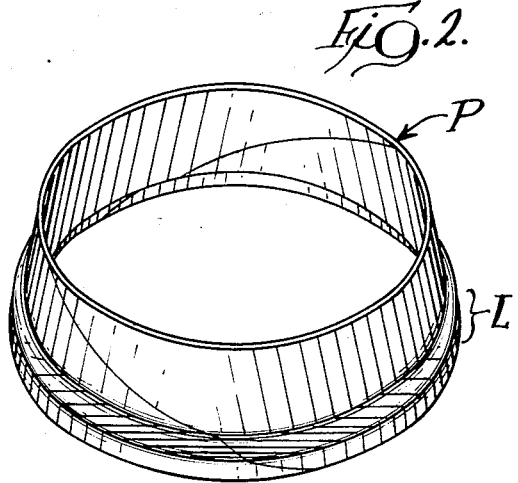
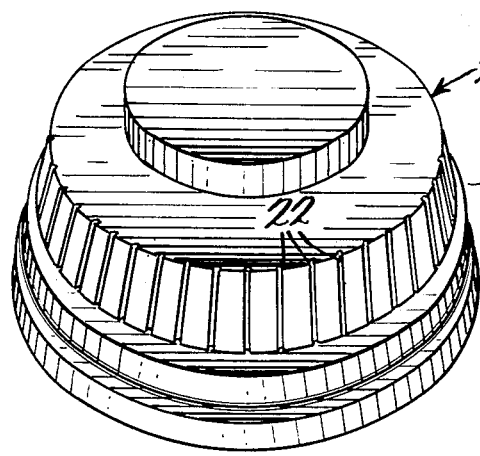
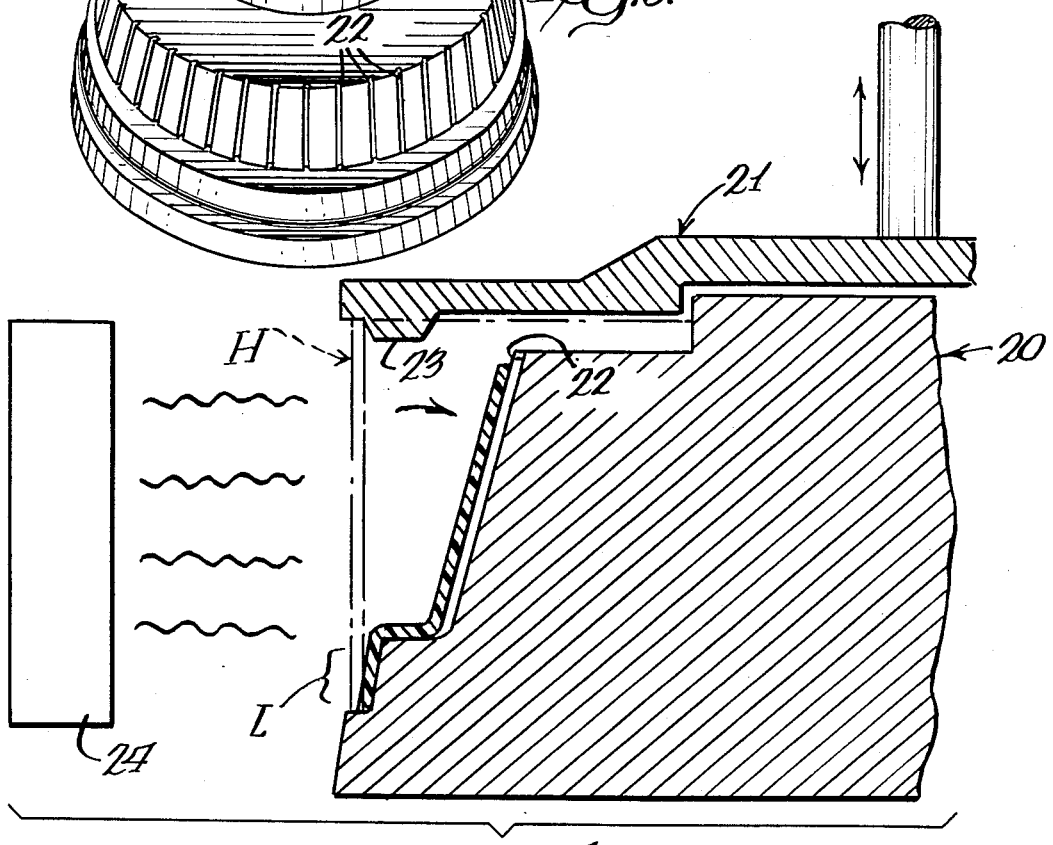

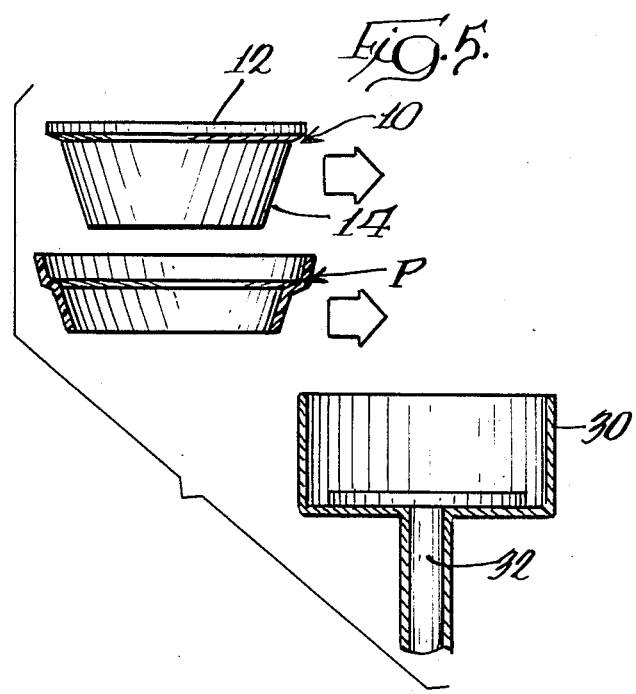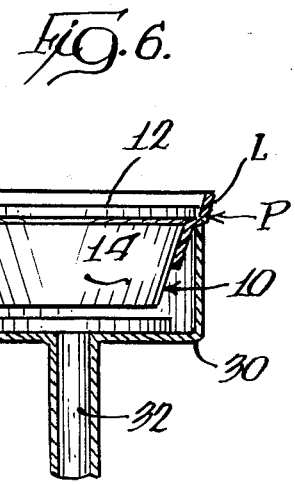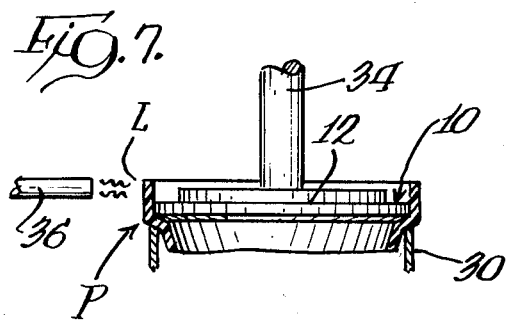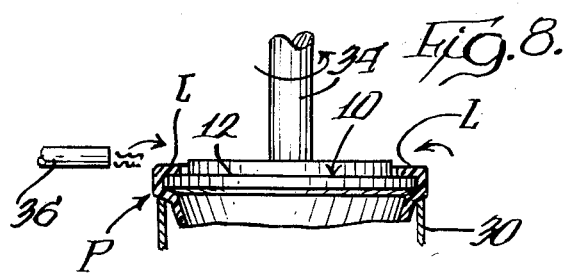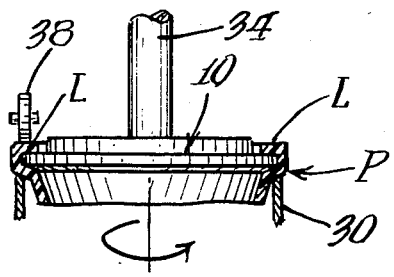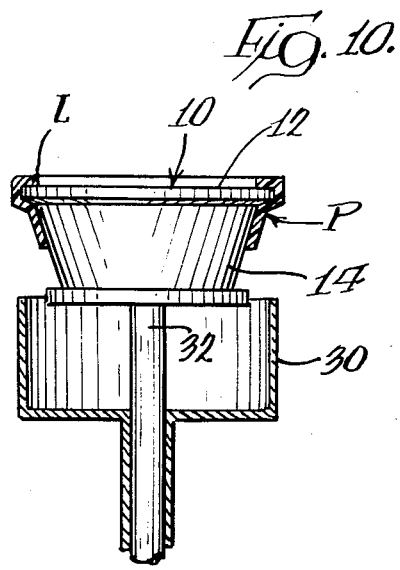

METHOD AND APPARATUS FOR PREFORMING AND APPLYING A HEAT-SHRINKABLE MEMBER TO A CONTAINER

TECHNICAL FIELD

The present invention relates generally to methods of applying heat-shrinkable members to associated containers, and more particularly to a method and apparatus for preforming and subsequently applying a heat-shrinkable member, such as a tamper-indicating band, to a container.

BACKGROUND OF THE INVENTION

To prevent unauthorized opening or tampering of containers holding food products, beverages, pharmaceuticals, and the like, it is highly desirable to provide a tamper-indicating arrangement which will clearly visually indicate that a container has been opened or tampered with. One type of tamper-evident seal that has been used in the past is a heat-shrinkable member, usually comprising heat-shrinkable thermoplastic material. Such a heat-shrinkable member is usually applied to an associated container in a generally cylindrical form, with heat thereafter applied to the member so that it shrinks and conforms to the associated container. The material from which the member is formed and the manner in which it is applied are selected such that upon attempted opening or opening of the container, the member is visually and permanently deformed to indicate attempted opening or opening. Copending U.S. patent application Ser. No. 451,401, filed Dec. 20, 1982, discloses a method and apparatus for forming spirally wound heat-shrinkable members which facilitate inexpensive and high speed formation of such tamper-evident seals.

While generally cylindrical heat-shrinkable members are suitable for application to many types of containers, their application to some types of containers can be problematical. The configuration of some containers is such that heat-shrinking application of cylindrical tamper bands thereto must be very carefully controlled to assure uniform shrinkage of the bands so that they properly embrace the containers. However, since tamper band application is preferably performed attendant to high speed packaging of products, it is frequently impractical or impossible to sufficiently control and monitor tamper band application to assure the desired interaction of the bands with their associated containers. Thus, it is desirable to provide a method of applying heat-shrinkable tamper bands or like members to containers so that it is possible to better control the heat-shrinking of the members into a configuration which will conform to the configuration of the containers to which the members are applied.

Another problem encountered with heat-shrink fitment of tamper bands or like members to containers relates to the manner in which they are heat-shrunk. After the members have been positioned in association with the containers, the members are shrunk by the application of heat, which is typically accomplished by passing the containers through a heat tunnel or like heat source so that the heat-shrinkable members are substantially entirely heated and shrunk into conformance with the containers.

While the above-described application technique is acceptable for applying heat-shrinkable members to many types of products, the use of this technique with some products and some containers is not acceptable. Specifically, some products are adversely affected when subjected to the heat of a heat tunnel or like heat source provided for shrinking the heat-shrinkable members into conformance with their associated containers. For example, a product such as frozen dessert topping can be unacceptably discolored when excessively heated. Even though such products may be maintained in a frozen state until just prior to application of heat-shrinkable members thereto, applying sufficient heat to the entire heat-shrinkable member for it to shrink into conformance with the product container can still result in the unacceptable discoloration or other adulteration of the product. Similarly, some types of containers cannot withstand the heat required to effect shrinkage of the heat-shrinkable members into that desired conformance with the containers.

Accordingly, it is highly desirable to provide a technique by which a heat-shrinkable member can be applied and conformed to an associated container with minimal heating of the container and its contents.

SUMMARY OF THE INVENTION

In accordance with the present invention, a method and apparatus are disclosed for preforming heat-shrinkable members, and subsequently applying the members to associated containers such that the members are conformed to the configuration of the containers. The method of the present invention contemplates that a preferably generally cylindrical heat-shrinkable member is first partially heat-shrunk to form a preformed member which may at least partially conform to the configuration of the container to which the member is subsequently applied. The preformed member is then applied to the container and further conformed thereto. While this final application can be achieved by passage of the container through a heat tunnel or the like, the present invention contemplates that only a portion of the preformed member is locally heated, thus minimizing heating of the associated container and its contents.

While the present invention is particularly suited for applying heat-shrinkable, tamper-indicating members to associated containers, it will be recognized that the invention is readily adaptable for other applications wherein it is desirable to initially partially form a heat-shrinkable member, and thereafter complete formation of the member while it is positioned in association with a container or the like to which it is being applied. By this technique, heretofore unachievable control of the shrinking process is obtained, since the heat-shrinkable members can be partially pre-shrunk to a pre-selected form apart from their final application to containers.

In the preferred practice of the present invention, the heat-shrinkable members to be preformed and applied to containers are in a generally cylindrical form, with the members predominantly shrinkable in a radial direction. The heat-shrinkable member is first preformed to a configuration which may at least partially conform to the configuration of the container to which the member is to be applied. Preforming in this manner is accomplished by providing a preforming mandrel. The heat-shrinkable member is positioned in association with the preforming mandrel, and the member is then heated. This causes the member to shrink and conform to the configuration of the preforming mandrel, thus forming a preformed member of the pre-selected configuration.

Since preforming is effected apart from application of the heat-shrinkable member to a container, the preforming can desirably be carefully controlled. Further control of the performing method is provided by releasably retaining an annular edge portion of the heat-shrinkable member as it is heated for conformance to the preforming mandrel. Releasable retention in this manner acts to assure the uniformity of the resultant preformed member.

After the preformed member has been moved from association with the preforming mandrel, the preformed member is positioned in association with the container to which it is being applied. Notably, the preformed member can then be applied to the associated container by locally heating only a portion of the preformed member. The localized heating of the preformed member is preferably performed so as to minimize any heating of the associated container and its contents. However, if product and/or container heating need not be avoided, final application can also be effected by heating of the entire preformed member, such as by a passage through at heat tunnel.

In order to minimize the time required for further conforming the preformed member to the configuration of the container, engagement means can be provided for moving a portion of the preformed member into conformance with the container, such as the locally heated portion of the member. In the illustrated embodiment, the engagement means are provided by an engagement roller which is adapted to engage a portion of the preformed member by rotation of the container and the preformed member with respect to the engagement roller. By this technique, the preformed member is very quickly further conformed to the configuration of the container while heating of the container and its contents is avoided. Application of the heat-shrinkable member to the container is then complete.

Numerous other advantages and features of the present invention will become readily apparent from the following detailed description, the accompanying drawings, and the appended claims.

BRIEF DESCRIPTION OF THE DRAWINGS

FIG. 1 is a perspective view of a generally cylindrical, heat-shrinkable member to be preformed and applied to an associated container in accordance with the present invention;

FIG. 2 is a perspective view of a heat-shrinkable preformed member formed from the heat-shrinkable member of FIG. 1;

FIG. 3 is a perspective view of a preforming mandrel for forming the heat-shrinkable member of FIG. 1 into the preformed member of FIG. 2;

FIG. 4 is a diagrammatic view illustrating preforming of the preformed member of FIG. 2 by use of the preforming mandrel illustrated in FIG. 3; and FIGS. 5-10 are diagrammatic views illustrating the steps of applying the preformed member illustrated in FIG. 2 to an associated container.

DETAILED DESCRIPTION

While the present invention is susceptible of embodiment in various forms, there is illustrated in the drawings and will hereinafter be described a presently preferred embodiment of the invention, with the understanding that the present disclosure is to be considered as an exemplification of the invention, and it is not intended to limit the invention to the specific embodiment illustrated.

FIG. 1 illustrates a generally cylindrical, heat-shrinkable member H to be preformed and subsequently applied to an associated container. As will be noted from FIG. 1, member H is illustrated as a spirally wound cylinder formed from a strip of heat-shrinkable material wound spirally at an angle to the axis of the cylinder formed in accordane with the teachings of copending patent application Ser. No. 451,401, filed Dec. 20, 1982. As will be recognized, the present invention is readily adaptable for use in association with heat-shrinkable members formed other than in accordance with the above copending application. The member H is preferably formed from a heat-shrinkable thermoplastic material, such as expanded polystyrene, polypropylene, polyethylene, or polyvinyl chloride. When the member H is generally cylindrical as illustrated, it is preferably configured so as to be predominantly heat-shrinkable in a radial direction relative to its axis.

The heat-shrinkable member H is adapted to be applied to container 10, illustrated in FIG. 5. Container 10 is intended to be illustrative of a typical container construction, since it will be appreciated that the present invention can be readily practiced for applying heat-shrinkable members to containers of almost an endless variety of configurations. The container 10 includes a lid portion 12, and a bottom portion 14 which is generally downwardly inwardly tapering.

The present invention contemplates the preforming and subsequent application of heat-shrinkable member H to container 10 so that attempted opening or opening of the container by removal of its lid portion 12 requires permanent visible deformation of the heat-shrinkable member for tamper-indicating. However, the invention can also be employed for application of other than tamper-indicating members, such as protective sleeves that are sometimes fitted to containers.

In this regard, the present invention can be employed for forming and applying a combination protective sleeve/tamper band, which may also provide a label for the associated container. Notably, the provision of a protective sleeve or the like on a container desirably acts to rigidity the container itself, thus permitting the container to be made from relatively lighter gauge material for desired economy in fabrication of the container. Further, application of heat-shrinkable members to provide labels for containers desirably permits the use of a single type or color of container for different varieties of a product, with appropriately different heat-shrinkable labels applied to the like containers to identify the different varieties of the product.

FIG. 2 illustrates a heat-shrinkable preformed member P formed from the member H of FIG. 1 in accordance with the present invention. As will be noted, preformed member P has a configuration which is at least partially conforming to the configuration of container 10 to which it will be applied. The formation of preformed member P from member H is effected by use of a preforming mandrel 20, illustrated in FIG. 3.

Preforming mandrel 20 is partially configured like the container 10, more specifically, the mandrel 20 has a generally inwardly tapering configuration like the inwardly tapering configuration of the bottom portion 14 of container 10. Ordinarily, the preforming mandrel will be at least partially generally configured like the container to which the preformed member P is to be applied, but the configuration of the preforming mandrel is selected to form member P to the desired configuration which facilitates subsequent application of member P to a container, and thus the mandrel 20 is not necessarily configured like the container.

FIG. 4 diagrammatically illustrates the formation of preformed member P from heat-shrinkable member H by the use of preforming mandrel 20 and a retaining member 21. As shown in this figure, the heat-shrinkable member H is positioned in association with preforming mandrel 20 such that the member H extends generally about the preforming mandrel. Thereafter, retaining member 21 and preforming mandrel 20 are relatively moved so that a preferably continuous retaining lip portion 23 of the retaining member is positioned in association with the annular edge portion of the member H generally adjacent and inwardly of the annular edge portion.

Significantly, retaining member 21 acts to releasably retain the edge portion of member H during heating of the member H to facilitate formation of preformed member P. By this retention, a progressive shrinking action is provided. Since the lower portion of the member H is in relatively closer association with preforming mandrel 20 when heat-shrinking is initiated, that portion requires a somewhat greater heat input to shrink into the desired conformance with mandrel 20. In contrast, the free upper portion of member H, which is spaced further from mandrel 20, would begin to shrink relatively quickly if not releasably retained, and thus fold over or otherwise shrink in an unintended manner. Accordingly, the retaining member 21 releasably retains the upper edge portion of member H during heat-shrinking, thus allowing sufficient time for the remainder of the member H to move toward conformance with mandrel 20. Subsequently, the upper edge portion of member H slips off of lip portion 23 of retaining member 21 to complete formation of preformed member P of the desired uniformity.

After member H has been positioned in association with retaining member 21 and preforming mandrel 20 as illustrated, the entire member H is subjected to heat causing it to shrink inwardly and conform to preforming mandrel 20 so that preformed member P is formed. In this regard, the preforming mandrel 20 is preferably configured to accommodate the passage of air from between the preforming mandrel and the heat-shrinkable member H as the member H shrinks onto the preforming mandrel. In the illustrated embodiment, preforming mandrel 20 defines a plurality of vent passages 22 to prevent build-up of air between the preforming mandrel 20 and the heat-shrinkable member H which could otherwise form air bubbles or like irregularities in the resultant preformed member P. Suction means applied through vent holes defined by preforming mandrel 20 can also be employed to prevent undesired irregularities.

The heat for shrinking heat-shrinkable member H to form preformed member P is provided from a suitable heat source designated 24. This heat source may comprise a heat tunnel or oven within which the preforming mandrel 20 and the heat-shrinkable member H are positioned, or may comprise a heat source which acts directly against only a portion of heat-shrinkable member H, with rotation of preforming mandrel 20 and retaining member 21 together with heat-shrinkable member H assuring the complete heating of member H so that preformed member P is formed.

To facilitate subsequent application of preformed member P to container 10, the preformed member is preferably formed to be slightly larger than the container. This can be achieved by sizing preforming mandrel 20 to be slightly larger than the portion of the container to which the member P is to be applied, or by controlling the preforming heat-shrinking of member H so that it does not conform too tightly to the preforming mandrel.

After the preformed member P has cooled sufficiently to permit it to be handled without undesired deformation, the member P is moved out of association with preforming mandrel 20, and is ready for application to container 10. FIGS. 5–10 diagrammatically illustrate application of preformed member P to container 10 so that the preformed member is further conformed to the configuration of container 10. When the member P is to be applied to container 10 for tamper-indication, the member P is conformed to the container such that opening of the container by removal of its lid portion 12 results in permanent, visual deformation of the preformed member P.

FIGS. 5 and 6 illustrate movement of container 10 and preformed member P into association with each other and into association with the portion of the apparatus of the present invention for applying the preformed member P to the container 10. To this end, the apparatus can include a supporting member 30 adapted to receive the preformed member P and the container 10, as illustrated in FIG. 6. Supporting member 30 may comprise one of a plurality of such supporting members provided on a rotary, turret-type packaging machine adapted for sequential, high speed application of preformed members such as P to respective associated containers such as 10. When positioned in association with container 10 as illustrated in FIG. 6, the member P conforms to the portion of the container which generally provided the profile of preforming mandrel 20. If desired, the apparatus may include an ejector member 32 which is vertically movable with respect to supporting member 30 to facilitate ejection of container 10 and its heat-shrinkable member P after application of member P is complete.

Referring now to FIG. 7, the present apparatus may include a rotating drive member 34 which is positioned atop lid 12 of container 10 by relatively vertically moving the member 34 and the container 10. The preformed member P is now ready to be further heated so that it further shrinks and conforms to container 10, specifically so that the preformed member P overlies a portion of the lid portion 12 of the container.

While passage of container 10 through a heat-tunnel or the like may be suitable for final application of the preformed member P in some instances, heating of container 10 and its contents is avoided by localized heating of a portion of the preformed member. Localized heat source 36 is provided for this purpose. Heat source 36 may comprise a nozzle or the like for directing a heated air stream against a portion L of preformed member P which is to be locally heated. To minimize the heating of container 10 and its contents, the heat source 36 is preferably configured to minimize the impingement of heat energy on other than locally heated portion L. Accordingly, the locally heated portion of the preformed member P in the illustrated embodiment comprises the portion of the member P opposite from its inwardly-most tapered portion. It should be further noted that in the illustrated embodiment the configuration of supporting member 30, which receives substantially the entire container 10, and the configuration of rotating drive member 34, which substantially covers the entire lid portion 12 of the container, further act to minimize the heating of container 10 by localized heat source 36.

In order to locally heat the entire upper annular edge portion L of preformed member P, the container 10 and preformed member P are preferably rotated with respect to heat source 36, as illustrated in FIG. 8. Rotation in this manner can be effected by rotation of rotary drive member 34 and/or by rotation of supporting member 30. As the container and the preformed member P are rotated, all of the locally heated portion L of member P is heated so that it shrinks and thereafter conforms to configuration of container 10, specifically by moving into overlying relation with the cover 12 of container 10.

To assure conformance of member P to container 10 in the intended manner, such as for tamper-indication, and to effect conformance in an efficient manner, means are preferably provided for moving the locally heated portion L of preformed member P into association with container 10. This is illustrated in FIG. 9 wherein an engagement roller 38 is provided for positively engaging locally heated portion L of preformed member P such that as the container and the preformed member are rotated, engagement roller 38 rollingly engages the locally heated portion of the preformed member. Such moving of locally heated portion L with engagement roller 38 can be performed in conjunction with the local heating of portion L with localized heat source 36, or may be performed just after the localized heating of portion L while portion L is still sufficiently pliable.

FIG. 10 illustrates the completed application of preformed member P to container 10 after the locally heated portion L of preformed member P has been moved to its final position in association with the container. The container 10 can then be ejected from supporting member 30 such as by relative vertical movement of the supporting member 30 with respect to ejector member 32. The container 10 can then be moved from the apparatus for subsequent packaging, storage, and shipment.

As will be recognized from the foregoing description of the present invention, its disclosure in association with container 10 as shown is intended as illustrative but not limiting. The present method and apparatus can be used for applying heat-shrinkable members to many different containers, and is particularly suited for application of a heat-shrinkable member to a container when partial preforming of the member prior to its application to a container is desired, with the preformed heat-shrinkable member being subsequently applied to the container and further conformed thereto such as for tamper-indication or the like.

From the foregoing, it will be observed that numerous variations and modifications may be effected without departing from the true spirit and scope of the novel concept of the present invention. It will be understood that no limitation with respect to the specific embodiment illustrated herein is intended or should be inferred. It is, of course, intended to cover by the appended claims all such modifications as fall within the scope of the claims.

What is claimed is:

1. A method of applying a generally cylindrical, heat-shrinkable member to a container, wherein said container includes a lower portion having a downwardly inwardly tapered configuration and a lid portion fitted to said lower container portion, said method comprising the steps of:

providing preforming mandrel means at least partially configured like said container, wherein said mandrel means includes an inwardly tapered portion configured like said lower container portion;

providing said heat-shrinkable member in the form of a spirally-wound cylinder which is predominantly heat-shrinkable in a radial direction, wherein said cylinder comprises a strip of heat shrinkable material wound spirally at an angle to the axis of said cylinder;

positioning said heat-shrinkable member in association with said preforming mandrel means;

heating said heat-shrinkable member so that it conforms to said preforming mandrel means to form a preformed member from said heat-shrinkable member, and releasably retaining an edge portion of said heat-shrinkable member positioned furthest from said preforming mandrel means during said heating, said preformed member being at least partially configured like said container and, including an inwardly tapered portion;

moving said preformed member from association with said preforming mandrel means and positioning said preformed member in association with said container so that said tapered portion of said preformed member fits about the inwardly tapered lower portion of said container; and applying said preformed member to said container by heating said preformed member so that is shrinks and further conforms to the configuration of said container to overlie said lid portion.

2. A method in accordance with claim 1, including providing said preforming mandrel means with air passage means to accommodate passage of air from between said heat-shrinkable member and said preforming mandrel means.

3. A method in accordance with claim 1, wherein said heating during said applying step includes locally heating a portion of said preformed member for heat-shrinking said locally heated portion.

4. A method in accordance with claim 3, wherein said applying step further includes moving said locally heated portion of said preformed member with engagement means for further conforming said preformed member to the configuration of said container.

5. A method in accordance with claim 4, wherein said applying step further includes rotating said preformed member and said container with respect to said engagement means during engagement of said engagement means with said locally heated portion.

6. A method in accordance with claim 5, wherein said engagement means comprises roller means for rollingly engaging said locally heated portion during said rotation.

7. A metnod in accordance with claim 3, wherein said preformed member is preformed on said mandrel means to have a generally inwardly tapering configuration, said preformed member being locally heated at its portion opposite its inwardly-most tapered portion.

8. A method of applying a generally cylindrical, heat-shrinkable member to a container, wherein said container includes a lower portion having a downwardly inwardly tapering configuration and a lid portion fitted to said lower container portion, comprising the steps of:

providing preforming mandrel means at least partially configured like said container, including an inwardly tapered portion configured like said lower container portion;

positioning said heat-shrinkable member in association with said preforming mandrel means;

heating said heat-shrinkable member so that it conforms to said preforming mandrel means to form a preformed member from said heat-shrinkable member, said preformed member being at least partially configured like said container and including an inwardly tapering portion;

releasably retaining an edge portion of said heat-shrinkable member positioned furthest from said mandrel means during said heating of said member with retaining means whereby heat-shrinkage of said member causes said edge portion to be released from said retaining means;

moving said preformed member from association with said preforming mandrel means and positioning said preformed member in association with said container so that said inwardly tapered portion of said preformed member fits about said lower container portion; and applying said preformed member to said container by locally heating a portion of said preformed member while avoiding heating of other portions of said preformed member so that said preformed member shrinks and further conforms to the configuration of said container and overlies said lid portion of said container while minimizing heating of the container.

9. An apparatus for applying a heat-shrinkable member to a container wherein said container includes a lower portion having a downwardly inwardly tapered configuration and a lid portion fitted to said lower container portion, comprising:

means for preforming said heat-shrinkable member to form a preformed member having a pre-selected configuration comprising preforming mandrel means positionable in association with said heat-shrinkable member, said preforming mandrel means being at least partially configured like said container and including an inwardly tapered portion configured like said lower container portion, and means for heating said heat-shrinkable member while in association with said mandrel means;

means for releasably retaining an edge portion of said heat-shrinkable member positioned furthest from said mandrel means during heating thereof when the heat-shrinkable member is positioned in association with said preforming mandrel means to avoid premature shrinkage of said releasably retained portion of said heat-shrinkable member, to thereby form said preformed member with an inwardly tapered portion;

means for positioning said preformed member in association with said container so that said inwardly tapered portion of said preformed member fits about said inwardly tapered lower container portion; and means for applying said preformed member to said container comprising means for heating at least a portion of said member to further conform said member to the configuration of said container so that said member overlies said container lid portion.

10. An apparatus in accordance with claim 9, wherein said applying means comprises means for heating at least a portion of said preformed member.

11. An apparatus in accordance with claim 10, wherein
said applying means further includes engagement means adapted to engage said heated portion of said preformed member for moving said heated portion to conform said preformed member to said container.

12. An apparatus in accordance with claim 11, including
means for rotating said preformed member and said container while said engagement means engages said heated portion of said preformed member.

13. An apparatus in accordance with claim 9, wherein said applying means comprises means for locally heating a portion of said preformed member, and means for moving said locally heated portion to conform said preformed member to said container.

* * * * *